United States Patent [19]

Hahn et al.

[11] 3,946,474

[45] Mar. 30, 1976

[54] ROTARY CUTTING HEAD

[75] Inventors: Norman Hahn; Raymond G. Martin, both of East Earl, Pa.

[73] Assignee: Conestoga Wood Products, Inc., East Earl, Pa.

[22] Filed: June 3, 1974

[21] Appl. No.: 475,515

[52] U.S. Cl. .............. 29/105 R; 144/218; 144/230
[51] Int. Cl.² ...................... B26D 1/28; B27G 13/04
[58] Field of Search ........... 29/105 R, 108; 408/197; 144/218, 221, 230, 229

[56] References Cited
UNITED STATES PATENTS

| | | | |
|---|---|---|---|
| 2,173,868 | 9/1939 | Weddell et al. | 29/105 R |
| 2,381,806 | 8/1945 | Clark | 29/105 X |
| 3,785,417 | 1/1974 | Vora | 144/230 X |
| 3,798,724 | 3/1974 | Czopor | 29/105 R |

FOREIGN PATENTS OR APPLICATIONS

| | | | |
|---|---|---|---|
| 254,871 | 1/1949 | Switzerland | 144/230 |
| 1,160,223 | 7/1958 | France | 144/230 |

Primary Examiner—Travis S. McGehee
Assistant Examiner—W. D. Bray
Attorney, Agent, or Firm—James J. Kennedy

[57] ABSTRACT

A cylindrical rotary cutting head rotatable about a longitudinal axis having a plurality of helical slots in which a plurality of bits carrying cutting edges are retained in the lateral direction by means of set screws which bear against a "V" groove in an inclined face of the bit and in the vertical direction by plurality of cooperating serrations on an opposite face of the bit and in one slot wall.

3 Claims, 7 Drawing Figures

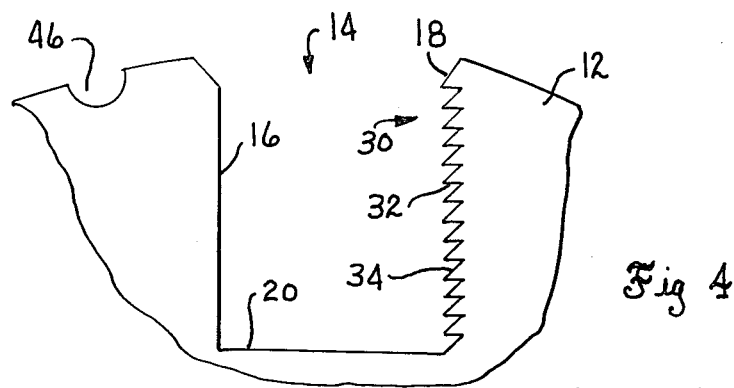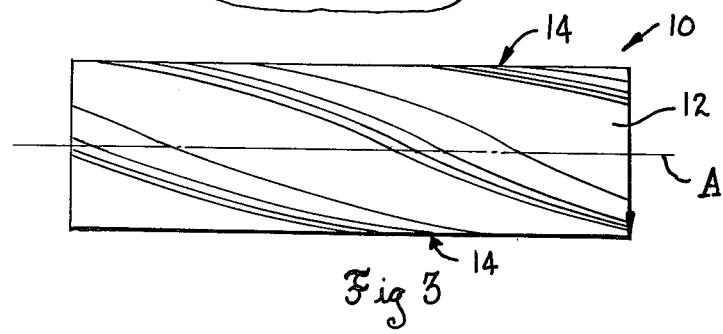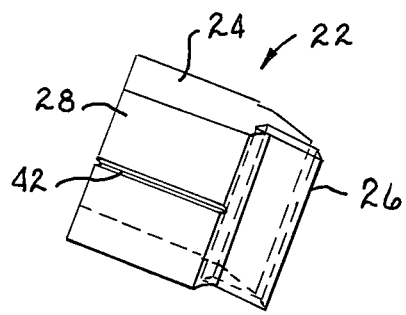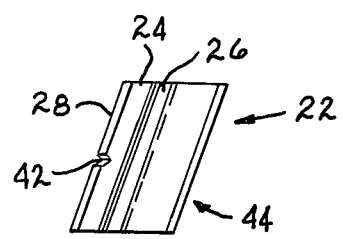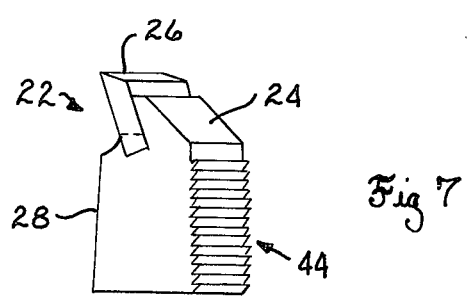

ROTARY CUTTING HEAD

BACKGROUND OF THE INVENTION

This invention relates generally to rotary cutters and particularly to cutters such as milling cutters or planing heads in which the cutting elements are disposed helically about the body of the cutter in the direction of the longitudinal axis of rotation of the head. Usually the cutting elements are disposed in helical slots in such a way that they can be vertically adjusted within the slot and so that they can be replaced or removed for sharpening purposes, repositioning, or the like. It is known to seat the cutters by means of wedging devices, positive stops, or screw means in the slots and cooperable serrations cut in the cutter and in one of side walls of the helical slots which intermesh. In this way the cutters are maintained in a fixed position relative to the head. Until the advance described by the present invention, there have been no known cutting heads which use cutters which can be removed or repositioned without subjecting the head, and consequentially the corresponding machine, to a great deal of down time (some designs require the head to be out of service for as much as 3 to 4 days) because of the long trial and error process using special tools which is required to reposition all the cutters at the same precise location with respect to the head so that all the cutters describe the same diameter as the head rotates.

SUMMARY OF THE INVENTION

One of the principle objects of the present invention is to permit the use of a single cutter design which can be located anywhere on the head and which has a simple design which will permit replacement or adjustment with the minimum amount of down time (in the range of one half day or less).

Another object of the invention is to provide retaining or locking means for the cutters which are simple and require minimal adjustment.

A further object of the invention is to provide retaining or locking means for the cutters which do not require special tools to set the precise location of cutters within the head.

A still further object of the invention is to provide for a plurality of cooperable serrations in the helical slot walls and on the cutter walls which with the retaining or locking means constrain the cutters from either vertical or lateral movement without the need for special or separate wedging members or positive stops in the slots.

As a result of the novel interrelationship of components as described by the present invention, the number and size of the cutters is reduced because the cutters can be staggered with respect to each other in the adjacent slots. This staggering of the cutters also produces a further desired result inasmuch as it reduces the noise level emitted by the head during its operation when compared to heads using continuous helical cutters running the full length of the slots.

In wood planing operations, this staggered orientation of the cutters enhances the quality of the planning action inasmuch as the planing action is performed by a series of overlapping cutters, rather than by a series of continuous cutters which contact a larger surface area. This is particularly true where a knot is encountered in a board surface. A head with continuous cutters is more likely to lift out the knot and the surrounding area, then is a head having staggered cutters.

These and other objects of the invention will become more apparent from the following detailed description and the accompanying drawings.

BRIEF DESCRIPTION OF THE DRAWINGS

FIG. 3 is a reduced plan view of a helical planing head showing three helical slots without cutters.

FIG. 4 is an enlarged end view of a slot showing the serrations in the slot wall in detail.

FIG. 5 is a rotated side elevation of a typical cutter shown in FIG. 7.

FIG. 6 is a plan view of the cutter shown in FIG. 7.

FIG. 7 is a perspective view of a typical cutter.

DESCRIPTION OF THE PREFERRED EMBODIMENT

For purposes of the description, the invention will be discussed as it relates to a rotary planing head, but it is not the intention to so limit the applicability of the invention, since it relates equally well to rotary cutters in general.

Figure 1:
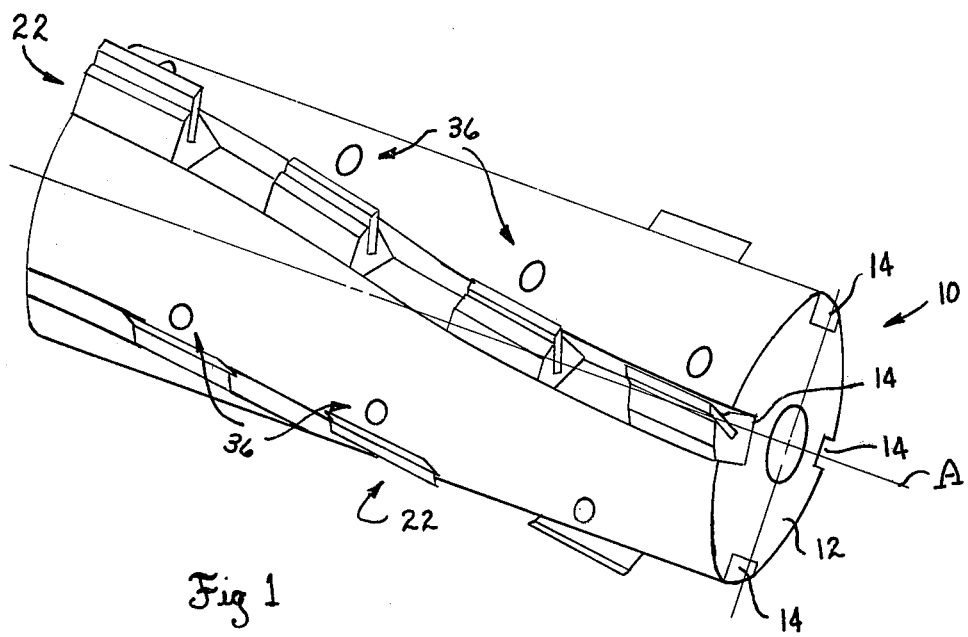
FIG. 1 is a perspective view of a helical planing head of the type described by the present invention showing the staggered relation of the cutters.

Referring to the drawings, particularly FIGS. 1 and 3, a rotary cylindrical planing head 10 has a body portion 12 which is rotatable about a longitudinal axis "A". A plurality of slots 14 are provided in body portion 12 and are formed in any suitable manner so as to wind in a generally helical fashion around body 12 in a longitudinal direction over the length of the head 10.

Figure 2:
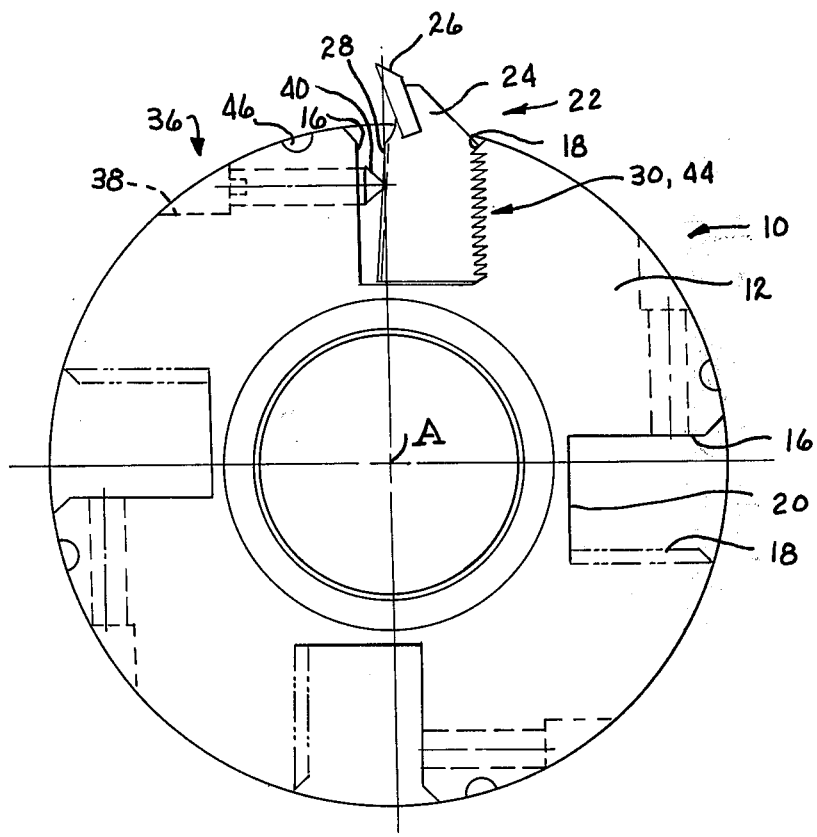
FIG. 2 is an end view of the helical planing head illustrated in FIG. 1, but showing only one cutter.

Each helical slot 14 is comprised of a pair of parallel side walls 16 and 18, as shown in FIG. 2, and a flat bottom portion 20. On at least one side wall of each slot 14 there are provided a plurality of serrations 30 which extend from the bottom wall 20 to a point generally adjacent the top of the side wall at the mouth of the slot. In this instance, side wall 18 is provided with the serrations. The serrations 30 extend the full length of each slot.

A plurality of cutting means 22 are adapted to be received in each of the slots 14, as shown in FIGS. 1 and 2. The cutting means 22 may be disposed in adjacent side by side relation or they may be arranged in a spaced apart relation with the cutting means being disposed in adjacent slots in overlapping or staggered relation as shown in FIG. 1.

Referring to FIGS. 2 and 5–7, each of the cutting means 22 are identical in size and shape and are comprised of a steel holder or body portion 24 and a cutting edge or bit 26 of suitable material such as tungsten carbide. The cutting edge 26 is welded or otherwise integrally fastened to body 24 so that the cutting means is disposed in the slots 14, as shown in FIG. 1.

The body 24 of each cutting means 22 is provided with an inclined face 28 which is best shown in end view in FIG. 2. The body 24 is wider at the bottom than at the top. A generally vertically extending V shaped groove 42 is formed in the inclined surface 28 over its entire length. The vertical groove is located symetrically with repsect to body 24 and is of uniform depth over its entire length.

On the surface of body 24 opposite the inclined surface 28, there are provided a plurality of serrations 44 which extend from the bottom of body 24 to the top thereof. These serrations are similar to the serrations 30 formed in side wall 18 of slot 14 and they are adapted to cooperate therewith in an interlocking fashion to form a seating means for the cutting means 22 within the slot 14.

As can be seen in FIG. 4, each of the serrations 30 are comprised of a generally outwardly extending, horizontal portion 32 and an upwardly inclined portion 34. This configuration is contrasted to the more typical zig-zag serration pattern with no horizontal portions. The serrations 44 formed on cutting means 22 are similar in that they too are comprised of horizontally extending and inclined portions which are adapted to be received in serrations 30. The horizontally extending portions of each of the serrations provide a positive land or seat to restrict vertical movement of the cutting means relative to the head 10 when the cutting means is positioned. The inclined surfaces of both cutter and wall cooperate and serve to wedge the land portions of both elements tight against one another when the head is in use.

As shown in FIG. 2, locking means 36 are provided to further retain the cutting means 22 in position in the slot 14. The locking means is comprised of a bore 38 which extends through body portion 12, generally at an angle perpendicular to side wall 16, through side wall 16 and into slot 14. A set screw 40, threadably engaged in bore 38, extends into slot 14 and into engagement with the V groove 42 of cutting means 22. The wedging action of the set screw 40 in the V groove 42 against the inclined face 28 further forces the cooperating serrations 30, 44 into engagement thereby further constraining the vertical movement of cutting means 22 in the slot. Because of the wedge configuration of the cutter 22, the cutter can be moved in and out with respect to the slot and the set screw 40 will force the cutter serrations tight into the serrations of the slot wall to restrain the cutter.

At the same time, the interaction of the set screw 40 in the V groove 42 prohibits the lateral or longitudinal movement of the cutting means 22 in slot 14.

By this arrangement of elements, the cutting means 22 can be readily adjusted in the vertical direction as required by merely backing off the set screw 40 and moving each of the cutting means 22 up the same number of serrations and then retightening the set screw. Then by grinding the head of the cutting edges 26, each of the cutting means 22 will describe the same diameter as the head 10 is rotated. As can be readily appreciated this is a relatively simple operation and a far cry from the prior art devices which require trial and error positioning with special tools and by locating of wedging devices between the cutting means and the slot side wall or by removal of the cutting means and indexing it around to the next adjacent slot. In the past, this has been known to take 3 to 4 days to complete. It now can be completed in several hours. The majority of that time is used in re-leveling or grinding the cutting means to sharpen them.

A plurality of indexing grooves 46, one such groove for each slot, are provided to receive a follower on a grinding means (not shown) to assist the grinding means used to grind or sharpen the cutting edges 26 so that the head will be indexed (rotated) to follow the grinding machine.

As shown in FIG. 1, the cutting means 22 are located in the adjacent slots in the head in a staggered relation. That is, the cutting area of a cutting means 22 in adjacent slots overlaps each other. In this fashion a very desirable cutting action is obtained when planning wood, namely, the cutting means are less likely to lift out a knot and the surrounding area. Each of the cutting means contact only a portion of the knot area.

It has also been found that this staggered or overlapping pattern of the cutting means 22 reduce the noise level of the machine by a measurable amount during its operation. This is accomplished, because the contact between the work piece and the cutters is not continuous.

It should be understood, however, that in certain applications it may be desirable to display and use a continuous cutting edge. This can be accomplished by locating the cutting means 22 in the slots in a closely spaced apart relation and again overlapping the cutters of adjacent slots.

While this invention has been described in connection with a single embodiment thereof, it will be understood that this embodiment is capable of modification and that this application is intended to cover any variations, uses or adaptations following, in general, the principles of the invention and including such departures from the present disclosure as come within the known or customary practice in the art to which the invention pertains, and as fall within the scope of the invention or the limits of the appended claims.

We claim:

1. A rotary cutting head comprising, in combination, a cylindrical body rotatable about a longitudinal axis, a slot extending longitudinally along said body generally helically thereof, said slot having side walls, a plurality of serrations in one of said side walls, said serrations including a portion extending longitudinally outwardly of said wall to form a positive seating surface, cutting means in said slot, said cutting means having a first wall, a second inclined wall opposite said first wall and having a vertically extending groove therein and a plurality of serrations in said first wall corresponding to said serrations in said slot and cooperating therewith to seat said cutting means in said slot, and retaining means threadably adjustable with respect to said body, said retaining means extending through said side wall opposite said serrations into engagement with said vertically extending groove of said cutting means, said retaining means, inclined wall and vertical groove cooperating to force said corresponding serrations together whereby said cutting means is fixed both vertically and laterally with respect to said body.

2. A rotary cutting head, as set forth in claim 1, wherein said second wall inclines from a wider bottom portion to a narrower upper portion and said groove is of uniform depth over the length thereof.

3. A rotary cutting head, as set forth in claim 1, wherein said retaining means extends through said body having one end accessible from outside said body and the other end engaging said vertical groove in said cutting means.

* * * * *